US012503881B2

(12) United States Patent
Stumpp et al.

(10) Patent No.: US 12,503,881 B2
(45) Date of Patent: Dec. 23, 2025

(54) SELF-ADJUSTING LOCKING PIECE FOR A LOCKING UNIT

(71) Applicant: Sphinx Electronics GmbH & Co KG, Kenzingen (DE)

(72) Inventors: Sebastian Stumpp, Winden im Elztal (DE); Pascal Bodechon, Ettenheim (DE)

(73) Assignee: Sphinx Electronics GmbH & Co KG, Kenzingen (DE)

( * ) Notice: Subject to any disclaimer, the term of this patent is extended or adjusted under 35 U.S.C. 154(b) by 71 days.

(21) Appl. No.: 18/487,289

(22) Filed: Oct. 16, 2023

(65) Prior Publication Data

US 2024/0060331 A1 Feb. 22, 2024

Related U.S. Application Data

(63) Continuation of application No. PCT/EP2022/059800, filed on Apr. 12, 2022.

(30) Foreign Application Priority Data

Apr. 19, 2021 (DE) ..................... 20 2021 102 083.0

(51) Int. Cl.
*E05B 15/02* (2006.01)
*E05B 47/00* (2006.01)

(52) U.S. Cl.
CPC ...... *E05B 15/0255* (2013.01); *E05B 47/0038* (2013.01); *E05B 2015/027* (2013.01)

(58) Field of Classification Search
CPC .... E05B 15/024; E05B 15/02; E05B 15/0205; E05B 15/022; E05B 15/0245;
(Continued)

(56) References Cited

U.S. PATENT DOCUMENTS 2,681,245 A * 6/1954 Ackermans ......... E05B 15/0245 292/341.19
6,666,487 B2 * 12/2003 Oxley ..................... E05B 81/22 292/144

(Continued)

FOREIGN PATENT DOCUMENTS

CN 1388299 A 1/2003
DE 20 2008 004 173 U1 8/2009

(Continued)

*Primary Examiner* — Kristina R Fulton
*Assistant Examiner* — Noah Horowitz
(74) *Attorney, Agent, or Firm* — Orbit IP, LLP; Marc G. Martino

(57) ABSTRACT

A locking piece includes a housing which has a, in particular, rectangular housing opening and a slide which is arranged in the housing. At the housing side, the slide is guided so as to be able to be linearly displaced between two end positions and which has a locking arm which extends at right-angles with respect to the displacement direction of the slide and protrudes forward through the housing opening. A spring clip is arranged behind the slide, which spring clip extends in the displacement direction and which is anchored at the two clip ends thereof in the housing. The slide is arranged between the housing and the spring clip and is retained in abutment with the housing by the spring clip.

18 Claims, 2 Drawing Sheets

(58) Field of Classification Search
CPC ....... E05B 2015/027; E05B 2015/0275; E05B 2015/0295; E05B 85/04; E05B 85/045
See application file for complete search history.

(56) References Cited

U.S. PATENT DOCUMENTS

| | | | | |
|---|---|---|---|---|
| 6,715,808 | B2 * | 4/2004 | Oxley | E05B 81/22 292/144 |
| 7,029,043 | B2 * | 4/2006 | Fisher | E05B 15/0006 292/DIG. 40 |
| 8,047,582 | B1 * | 11/2011 | Rodgers | E05C 3/24 292/201 |
| 8,905,443 | B2 | 12/2014 | Alber | |
| 8,944,479 | B2 * | 2/2015 | Muramatsu | E05B 77/36 292/DIG. 3 |
| 9,297,183 | B2 * | 3/2016 | Williams | B65G 45/16 |
| 11,187,009 | B2 * | 11/2021 | Frame | E05B 15/022 |
| 2010/0314890 | A1 * | 12/2010 | Hemingway | E05B 81/22 292/341.15 |
| 2012/0001443 | A1 | 1/2012 | Mitchell | |
| 2012/0112477 | A1 * | 5/2012 | Muramatsu | E05B 85/045 292/342 |
| 2013/0180991 | A1 | 7/2013 | Williams | |
| 2021/0246687 | A1 * | 8/2021 | Digel | E05B 77/10 |
| 2021/0254367 | A1 | 8/2021 | Bodechon et al. | |

FOREIGN PATENT DOCUMENTS

| | | | | |
|---|---|---|---|---|
| DE | 10 2012 013 702 | A1 | 1/2014 | |
| DE | 202018106887 | U1 * | 2/2019 | E05B 15/022 |
| FR | 3010116 | A1 | 3/2015 | |
| KR | 101215262 | B1 | 12/2012 | |
| WO | 2007/073582 | A1 | 7/2007 | |

* cited by examiner

SELF-ADJUSTING LOCKING PIECE FOR A LOCKING UNIT

CROSS-REFERENCE FROM RELATED APPLICATIONS

This continuation application claims priority to PCT/EP2022/059800 filed on Apr. 12, 2022 which has published as WO 2022/223379 A1 and also the German application number 20 2021 102 083.0 filed on Apr. 19, 2021 the entire contents of which are fully incorporated herein with these references.

DESCRIPTION

Field of the Invention

The invention relates to a locking piece for a locking unit, comprising a housing which has a, in particular, rectangular housing opening, and a slide which is arranged in the housing and which, at the housing side, is guided so as to be able to be linearly displaced between two end positions and which has a locking arm which extends at right-angles with respect to the displacement direction of the slide and protrudes forward through the housing opening. The invention also further relates to a locking unit having such a locking piece.

Background of the Invention

Such a locking piece comprising a locking arm which is supported in a floating manner is disclosed, for example, in DE 20 2018 106 887 U1.

Swing doors and drawers are generally supported in an item of furniture by means of hinges or guides. The swing doors, drawers of the furniture carcass and the fittings themselves are subject to installation-related tolerances. Furthermore, as a result of the use and loading/actuation of the doors and drawers in the item of furniture, a degree of settlement behavior over time cannot be excluded. It is thereby possible that the locking piece may not be introduced sufficiently into the lock mouth or cannot be moved into the locking position or only with difficulty. The locking piece is then no longer in alignment with the lock mouth. It is therefore necessary with the locking piece to provide an adjustability, for example, in the form of elongate holes, so that the locking arm can always be (re)adjusted into the desired position relative to the lock mouth. Such adjustment operations are relatively laborious to carry out and time-consuming.

The locking piece known from DE 20 2018 106 887 U1 mentioned in the introduction for a locking unit comprises a housing having a housing opening, a locking arm, which engages through the housing opening and is supported in the housing opening so as to be able to be displaced in the direction perpendicular to the longitudinal direction thereof, and a slide which is guided so as to be able to be displaced in the housing in the displacement direction of the locking arm and which is coupled to the locking arm in the displacement direction. The housing and/or the slide are made from magnetically attractive material and between the housing and slide there acts at least one magnet which fixes the locking arm in position in any possible displacement position inside the housing opening. As a result of the floating support of the slide, it is ensured that the locking arm which is connected to the slide always assumes the optimum position in the lock mouth of a lock and also maintains this optimum position.

SUMMARY OF THE INVENTION

In contrast, an object of the invention is, with a self-adjusting, position-retaining locking piece of the type mentioned in the introduction, to provide an alternative securing of the slide in the housing. In particular, the securing is intended to be able to be constructed with the fewest possible components.

This object is achieved according to the invention with the locking piece of the type mentioned in the introduction in that a spring clip is arranged behind the slide, which spring clip extends along the displacement direction and is anchored at the two clip ends in the housing, wherein the slide is arranged between the housing and the spring clip and is held in abutment with the housing by the spring clip.

According to the invention, in order to secure the slide, only a single component, that is to say, the spring clip, is required. The locking arm which is supported in a floating manner is adjusted itself when moving into the lock mouth of a lock with respect to the position of the lock mouth.

In a particularly preferred manner, the slide is pressed by the spring clip into abutment against the housing in such a manner that the slide is fixed in position in each of the displacement positions thereof which are possible in the displacement direction. After moving out of the lock mouth, the locking arm is retained by the spring clip in the adjusted position on the housing by means of frictional engagement which retains the locking arm in every possible displacement position within the housing opening or fixes it in position. A stepless displacement of the slide and the locking arm is possible by means of application of force which overcomes the frictional engagement in a displacement direction on the locking arm and consequently on the slide.

Preferably, the slide has a recess which is open at the rear side and in which a permanent magnet is received behind which the spring clip engages and which is thereby retained in the recess. The permanent magnet cooperates with a reed contact of the lock in order to detect the locking arm in the lock.

Preferably, the spring clip engages in a rear longitudinal groove, which extends in the displacement direction, of the slide, whereby the slide and spring clip are mutually guided.

In a preferred embodiment of the locking piece according to the invention, the two clip ends are in each case angled in a hook-like manner, and the spring clip, when viewed in the direction toward the rear, engages behind the housing with the two forward-facing, hook-like clip ends thereof. Preferably, when viewed in the displacement direction, the housing has a securing hole at both sides of the housing opening, wherein the two hook-like clip ends engage through the securing holes and engage around the housing wall of the securing holes. Advantageously, the housing wall of the securing holes may have in each case a groove in which the hook-like clip ends engage.

In a particularly preferred manner, the spring clip is constructed in a C-shaped manner and may advantageously be a wire bracket or a metal strip bracket.

Preferably, the slide is displaceably guided internally on the housing and/or in the housing opening.

In a preferred embodiment of the locking piece according to the invention, the slide has a base portion, which is wider than the housing opening, and an intermediate portion which is arranged between the base portion and the locking arm and which carries the locking arm and is at a maximum as wide as the housing opening. In a further development, the locking arm is also wider than the housing opening. At the height of a, in particular, central displacement position of the slide, the housing opening, when viewed in the direction at right-angles with respect to the displacement direction, has at one or both sides a keyhole recess through which the locking arm is inserted as far as the outwardly protruding position thereof.

Advantageously, the locking arm may be in the form of a locking bracket or a locking eyelet.

The invention also relates to a—for example, mechanical or electronic—locking unit comprising a lock which has a lock mouth, in particular, a furniture lock, and a locking piece which is constructed as above and the locking arm of which engages in the locking position of the lock in the lock mouth and is locked therein. According to the invention, the locking arm is displaced in the lock mouth against the friction forces caused by the spring clip steplessly in the displacement direction in each case into the correct position, which is then maintained by the spring clip.

Preferably, the lock has a reed contact which cooperates with the permanent magnet of the locking piece. When the locking arm engages in the lock mouth, the reed contact is activated by the permanent magnet of the locking piece and thereby the locking arm which is located in the lock mouth is detected.

Other advantages of the invention will be appreciated from the description, the claims and the drawings. The features which have been mentioned above and those which will be set out in greater detail below can also be used individually or together in any combination. The embodiment shown and described is not intended to be understood to be definitive, but instead has more of an exemplary nature in order to describe the invention.

DETAILED DESCRIPTION OF EMBODIMENTS OF THE INVENTION

Figure 1:
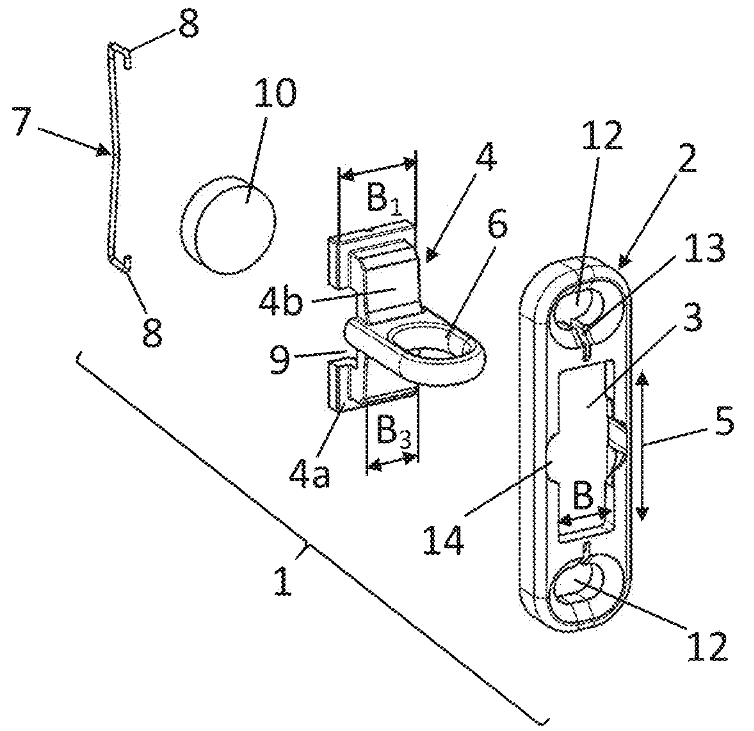
FIG. 1 shows an exploded illustration of the locking piece according to the invention comprising a height-displaceable locking arm which is supported in a floating manner.
Figure 2A:
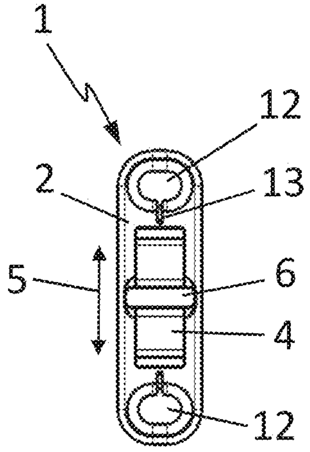
FIGS. 2*a*-2*e* show the locking piece according to the invention in a front view (FIG. 2*a*), in a side view (FIG. 2*b*), in a rear view (FIG. 2*c*), in a view from the top or bottom (FIG. 2*d*) and in a perspective view (FIG. 2*e*)
Figure 2B:
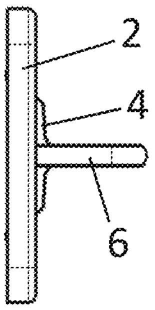
Figure 2C:
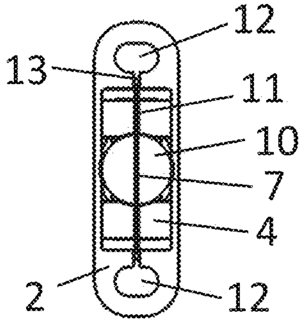
Figure 2D:
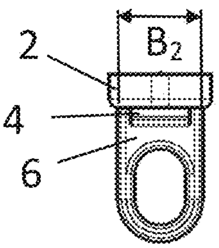
Figure 2E:
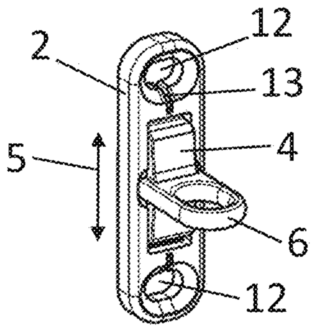

The locking piece 1 shown in FIGS. 1 and 2 for a locking unit 20 (FIG. 4) has a housing 2 having a, for example, rectangular housing opening 3 and a slide 4 which is arranged in the housing 2 and which is guided so as to be able to be displaced at the housing side between two end positions in a linear manner in the displacement direction (double-headed arrow) 5 which is vertical here. The slide 4 has a locking arm (for example, locking bracket or locking eyelet) 6 which extends at right-angles to the displacement direction 5 and which protrudes forward through the housing opening 3. The slide 4 may be displaceably guided internally on the housing 2 and/or in the housing opening 3.

A spring clip 7 (for example, wire bracket or metal strip bracket) is arranged behind the slide 4 and extends along the displacement direction 5 and is anchored at the two clip ends 8 in the housing 2. The slide 4 is arranged between the housing 2 and spring clip 7 and retained in abutment with the housing 2 by the spring clip 7. Preferably, the slide 4 which is supported in a floating manner is pressed by the spring clip 7 into abutment against the housing 2 in such a powerful manner that the slide 4 is fixed in position by the active friction force in each of the displacement positions thereof possible in the displacement direction 5.

The slide 4 has a recess 9 which is open at the rear side and in which a permanent magnet 10 is received. The spring clip 7 engages behind the permanent magnet 10 and thereby retains it in the recess 9. The slide 4 may at the rear side have a longitudinal groove 11 which extends in the displacement direction 5 and in which the spring clip 7 is placed. The locking arm 6 is held in position by the frictional engagement between the spring clip 7 and permanent magnet 10 and between the locking arm 6 and housing 2. In embodiments without a permanent magnet, the locking arm 6 is held in position by the frictional engagement between the spring clip 7 and locking arm 6 and between the locking arm 6 and housing 2.

As shown in FIG. 1, the spring clip 7 is preferably constructed in a C-shaped manner with two clip ends 8 which are angled in a hook-like manner. The two hook-like clip ends 8 are directed forward and engage through securing holes 12 of the housing 2, which, when viewed in the displacement direction 5, are arranged at both sides of the housing opening 3. The two hook-like clip ends 8 engage around the wall of the securing holes 12 and, when viewed in the direction toward the rear, engage behind the housing 2. The walls of the securing holes 12 may in each case have a groove 13, in which the hook-like clip ends 8 engage. Via the securing holes 12, the locking piece 1 is, for example, screwed to a door. Alternatively, however, the locking piece 1 may be adhesively bonded to the door so that in this instance the housing does not need to have any screw holes.

As further shown in FIG. 1, the slide 4 may have a base portion 4*a* and an intermediate portion 4*b* which is arranged between the base portion 4*a* and the locking arm 6 and which carries the locking arm 6. The base portion 4*a* and the locking arm 6 have, when viewed at right-angles to the displacement direction 5, a width B1, B2 in each case which is greater than the width B of the housing opening 3 (B1, B2>B). The width B3 of the intermediate portion 4*b* is at a maximum as wide as the width B of the rectangular housing opening 3 (B3≤B). At the height of a—in this instance, the central displacement position of the slide 4, the housing opening 3 has, when viewed in the direction at right-angles with respect to the displacement direction 5, at both sides a keyhole recess 14 through which the locking arm 6 is inserted into the outwardly protruding position thereof, and can then be displaced on the housing 2 in the displacement direction 5.

Figures 3A, 3B, 3C:
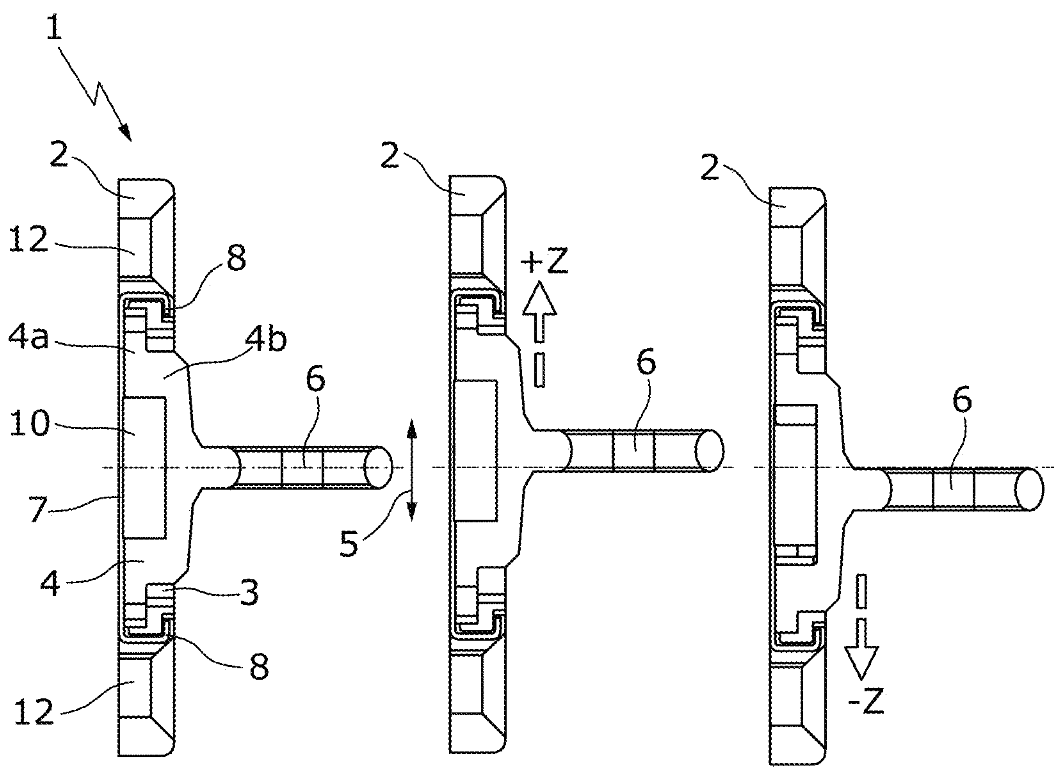
FIGS. 3*a*-3*c* show the locking piece according to the invention with the locking arm in a central position (FIG. 3*a*), in an upper end position (FIG. 3*b*) and in a lower end position (FIG. 3*c*), in each case in a longitudinal section.

The locking arm 6 is located in FIG. 3*a* in the central displacement position thereof in the housing opening 3 which is denoted by a dot-dash line, in FIG. 3*b* in the upper end position thereof which has been pushed upward out of the central displacement position by +Z (for example, 2.5 mm), and in FIG. 3*c* in the lower end position thereof pushed downward out of the central displacement position by −Z (for example, 2.5 mm). In each of the displacement positions thereof possible along the displacement direction 5, the locking arm 6 is held so as to be fixed in position by the spring clip 7.

Figure 4:
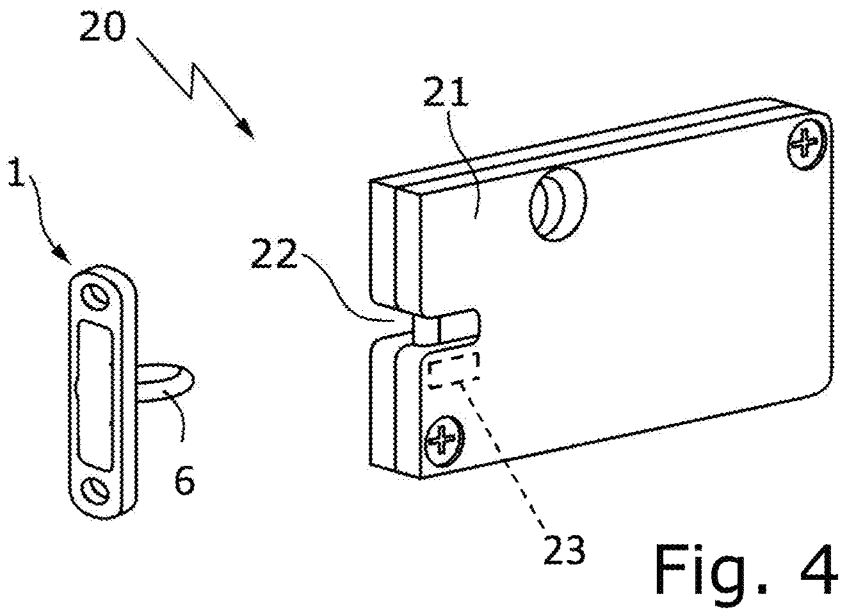
FIG. 4 shows a locking unit comprising a furniture lock and the locking piece according to the invention.

The locking unit 20 shown in FIG. 4 comprises a furniture lock 21 which can be mechanically or electronically activated and which has a lock mouth 22 and the locking piece 1 according to the invention, the locking arm 6 of which engages in the locking position of the furniture lock 21 in the lock mouth 22 and is locked therein. The height-displaceable locking arm 6 is adjusted itself when moving into the lock mouth 22 with respect to the vertical position thereof and remains held in the adjusted position by the spring clip 7 after moving out of the lock mouth 22. When the locking arm 6 is moved into the lock mouth 22, a reed contact (monitoring contact) 23 which is arranged on the lock mouth 22 is activated by the permanent magnet 10 of the locking piece 1 in order to thus detect the locking arm 6 which is located in the lock mouth 22. It can thus be determined whether the door/drawer/flap, etcetera, on which the furniture lock 21 or the locking piece 1 is mounted is open or closed.

In FIG. 4, the locking arm 6 is moved from the end face into the lock mouth 22 of the furniture lock 21, that is to say, in the longitudinal direction of the furniture lock 21, for example, in a sliding door. However, it is also possible for the locking piece 1 to be arranged at the side of the furniture lock 21 so that the locking arm 6 is retracted from the side into the lock mouth 22, that is to say, in the transverse direction of the furniture lock 21, for example, with a swing door.

What is claimed is:

1. A locking piece for a locking unit, comprising:

a housing which has a housing opening;

a slide which is arranged in the housing and which, at a housing side, is guided to be linearly displaced between two end positions;

wherein the slide has a locking arm which extends perpendicularly with respect to a displacement direction of the slide and protrudes forward through the housing opening; and a spring clip arranged behind the slide, wherein the spring clip comprises two clip ends, wherein the spring clip extends along the displacement direction, and wherein the spring clip is anchored at the two clip ends thereof in the housing;

wherein the slide is arranged between the housing and the spring clip, and wherein the slide is retained in abutment with the housing by the spring clip.

2. The locking piece as claimed in claim 1, wherein the slide is pressed by the spring clip into abutment against the housing, and wherein the slide is fixed in position in each of the displacement positions thereof which are possible in the displacement direction.

3. The locking piece as claimed in claim 1, wherein the slide has a recess which is open at a rear side and in which a permanent magnet is received, wherein the permanent magnet engages the spring clip and is retained by the spring clip in the recess.

4. The locking piece as claimed in claim 1, wherein the spring clip engages in a rear longitudinal groove, which extends in the displacement direction of the slide.

5. The locking piece as claimed in claim 1, wherein the two clip ends are each angled in a hook-like manner, and the spring clip, when viewed in the direction of the protrusion of the locking arm, engages behind the housing with the two, hook-like clip ends facing forward.

6. The locking piece as claimed in claim 5, wherein the housing, when viewed in the displacement direction, has first and second securing holes located on first and second sides of the housing opening and having first and second housing walls, and wherein each of the two hook-like clip ends engages through a respective one of the securing holes and engages around the housing wall of the respective securing holes.

7. The locking piece as claimed in claim 6, wherein each housing wall of the securing holes has a groove in which the hook-like clip ends engage.

8. The locking piece as claimed in claim 1, wherein the spring clip is constructed in a C-shaped manner.

9. The locking piece as claimed in claim 1, wherein the spring clip is a wire bracket or a metal strip bracket.

10. The locking piece as claimed in claim 1, wherein the slide is displaceably guided internally on the housing and/or in the housing opening.

11. The locking piece as claimed in claim 1, wherein the slide has a base portion and an intermediate portion, wherein the base portion is wider than the housing opening, and wherein the intermediate portion is arranged between the base portion and the locking arm, and wherein the intermediate portion carries the locking arm and is at a maximum as wide as the housing opening.

12. The locking piece as claimed in claim 11, wherein the locking arm is wider than the housing opening and the housing opening, when viewed in the direction perpendicular to the displacement direction of the slide, has at one or both sides a keyhole recess through which the locking arm is inserted as far as the protruding position thereof.

13. The locking piece as claimed in claim 1, wherein the locking arm is in the form of a locking bracket or locking eyelet.

14. A locking unit comprising a lock which has a lock mouth, and the locking piece as claimed in claim 1, the locking arm of which engages in a locking position of the lock in the lock mouth and is locked therein.

15. The locking unit as claimed in claim 14, wherein the lock has a reed contact which cooperates with the permanent magnet of the locking piece.

16. The locking piece as claimed in claim 1, wherein, as viewed in the displacement direction, the two clip ends are provided on opposite sides of the slide.

17. A locking piece for a locking unit, comprising:

a housing which has a housing opening;

a slide which is arranged in the housing and which, at a housing side, is guided to be linearly displaced between two end positions;

wherein the slide has a locking arm which extends perpendicularly with respect to a displacement direction of the slide and protrudes forward through the housing opening; and a spring clip arranged behind the slide, wherein the spring clip comprises two clip ends, wherein the spring clip extends along the displacement direction, and wherein the spring clip is anchored at the two clip ends thereof in the housing;

wherein the slide is arranged between the housing and the spring clip, and wherein the slide is retained in abutment with the housing by the spring clip;

wherein the two clip ends are each angled in a hook-like manner, and the spring clip, when viewed in the direction of the protrusion of the locking arm, engages behind the housing with the two hook-like clip ends facing forward.

18. A locking piece for a locking unit, comprising:

a housing which has a housing opening;

a slide which is arranged in the housing and which, at a housing side, is guided to be linearly displaced between two end positions;

wherein the slide has a locking arm which extends perpendicularly with respect to a displacement direction of the slide and protrudes forward through the housing opening; and a spring clip arranged behind the slide, wherein the spring clip comprises two clip ends, wherein the spring clip extends along the displacement direction, and wherein the spring clip is anchored at the two clip ends thereof in the housing;

wherein the slide is arranged between the housing and the spring clip, and wherein the slide is retained in abutment with the housing by the spring clip;

wherein the slide has a base portion and an intermediate portion, wherein the base portion is wider than the housing opening, and wherein the intermediate portion is arranged between the base portion and the locking arm, and wherein the intermediate portion carries the locking arm and is at a maximum as wide as the housing opening.

* * * * *